(12) United States Patent
Mizoguchi et al.

(10) Patent No.: US 11,806,866 B2
(45) Date of Patent: Nov. 7, 2023

(54) ROBOTIC SYSTEMS WITH ROUTING STABILITY MECHANISMS

(71) Applicant: MUJIN, Inc., Tokyo (JP)

(72) Inventors: Hironori Mizoguchi, Tokyo (JP); Masashi Watanabe, Tokyo (JP)

(73) Assignee: MUJIN, Inc., Tokyo (JP)

( * ) Notice: Subject to any disclaimer, the term of this patent is extended or adjusted under 35 U.S.C. 154(b) by 20 days.

(21) Appl. No.: 17/221,377

(22) Filed: Apr. 2, 2021

(65) Prior Publication Data

US 2021/0308879 A1    Oct. 7, 2021

Related U.S. Application Data

(60) Provisional application No. 63/004,509, filed on Apr. 3, 2020.

(51) Int. Cl.
| | | |
|---|---|---|
| *B25J 19/00* | (2006.01) | |
| *B25J 9/00* | (2006.01) | |
| *B25J 17/02* | (2006.01) | |

(52) U.S. Cl.
CPC ......... *B25J 19/0029* (2013.01); *B25J 9/0009* (2013.01); *B25J 17/0258* (2013.01)

(58) Field of Classification Search
CPC ... B25J 19/0029; B25J 9/0009; B25J 17/0258
See application file for complete search history.

(56) References Cited

U.S. PATENT DOCUMENTS

| | | | |
|---|---|---|---|
| 6,431,018 B1 * | 8/2002 | Okada | B25J 19/0025 74/490.02 |
| 6,684,731 B1 | 2/2004 | Karlinger | |
| 7,810,765 B2 | 10/2010 | Burlot | |
| 2009/0166478 A1 | 7/2009 | Choi | |
| 2010/0169815 A1 | 7/2010 | Zhao et al. | |
| 2012/0275571 A1 * | 11/2012 | Neuber | A61B 6/4464 378/194 |
| 2015/0328780 A1 * | 11/2015 | Burlot | B25J 19/0025 74/490.02 |

(Continued)

FOREIGN PATENT DOCUMENTS

| | | |
|---|---|---|
| CN | 101356043 A | 1/2009 |
| CN | 105189054 A | 12/2015 |

(Continued)

OTHER PUBLICATIONS

Japan Patent Office International Search Authority, PCT International Search Report and Written Opinion dated Jun. 8, 2021 for PCT/JP2021/014399 filed Apr. 2, 2021, 10 pages.

(Continued)

*Primary Examiner* — Randell J Krug
(74) *Attorney, Agent, or Firm* — Perkins Coie LLP

(57) ABSTRACT

A system and related methods for operating a robotic system with a routing mechanism is disclosed herein. The routing mechanism may surround external components that extend across a link and connect to an end effector. The routing mechanism may include guides, brackets, or a combination thereof configured to maintain the external components along a predetermined path relative to the link, the end effector, one or more corresponding joints, or a combination thereof during movement of the link and/or the end effector.

8 Claims, 13 Drawing Sheets

(56) References Cited

U.S. PATENT DOCUMENTS

2017/0282381 A1    10/2017    Inoue et al.

FOREIGN PATENT DOCUMENTS

| CN | 107263537 | A | 10/2017 |
| CN | 108369687 | A | 8/2018 |
| CN | 110293558 | A | 10/2019 |
| JP | 2016509543 | A | 3/2016 |
| JP | 2017185580 | A | 10/2017 |

OTHER PUBLICATIONS

Office Action dated Mar. 14, 2022 for Japanese Patent Application No. 2021-531282, 13 pages.
Decision to Grant dated May 16, 2022 for Japanese Patent Application No. 2021-531282, 3 pages.
Office Action dated Jul. 7, 2022 for Chinese Patent Application No. 202110996294.8, 7 pages.
CNIPA Notice to Grant dated Jan. 11, 2023 for Chinese Patent Application No. 202110996294.8, 4 pages.

* cited by examiner

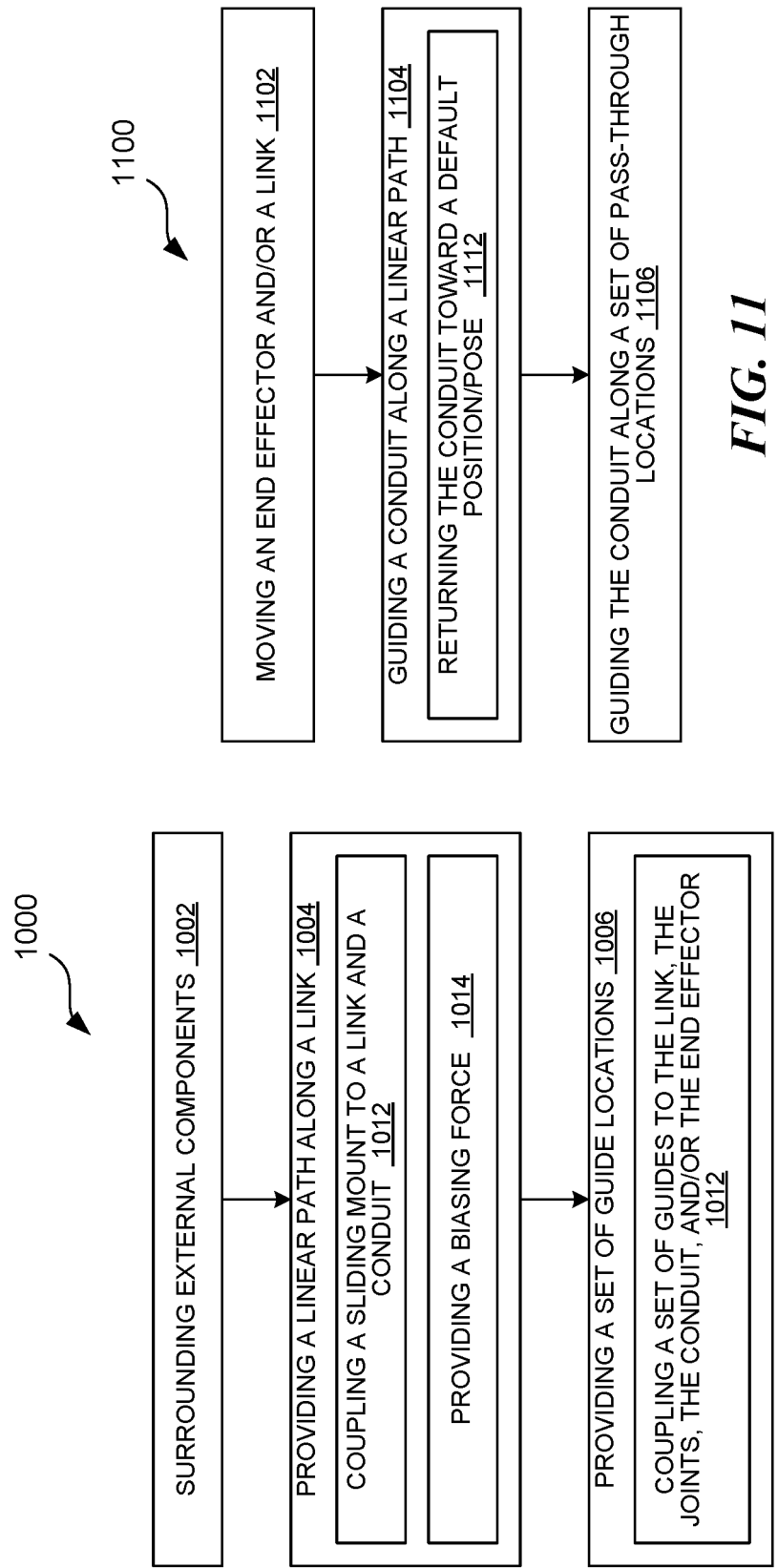

ROBOTIC SYSTEMS WITH ROUTING STABILITY MECHANISMS

CROSS-REFERENCE TO RELATED APPLICATIONS

This application claims the benefit of U.S. Provisional Patent Application Ser. No. 63/004,509, filed Apr. 3, 2020, which is incorporated herein by reference in its entirety.

TECHNICAL FIELD

The present technology is directed generally to robotics systems and, more specifically, robotic systems with routing stability mechanisms.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

Some complex tasks may not be replicated due to structural limitations of a robot, such as due to a joint of a robotic arm, an end effector, etc. Moreover, structural features or configurations may lead to errors or collisions (e.g., between the robot and external structures and/or between internal structures of the robot) during task executions. Accordingly, there remains a need for improved techniques and systems for managing the routing of robotic structures and for allowing robots to move freely using their full range of motion.

BRIEF DESCRIPTION OF THE DRAWINGS

FIG. 10 is an example flow diagram for assembling a robotic system in accordance with one or more embodiments of the present technology.

FIG. 11 is an example flow diagram for operating a robotic system in accordance with one or more embodiments of the present technology.

DETAILED DESCRIPTION

Figure 1:
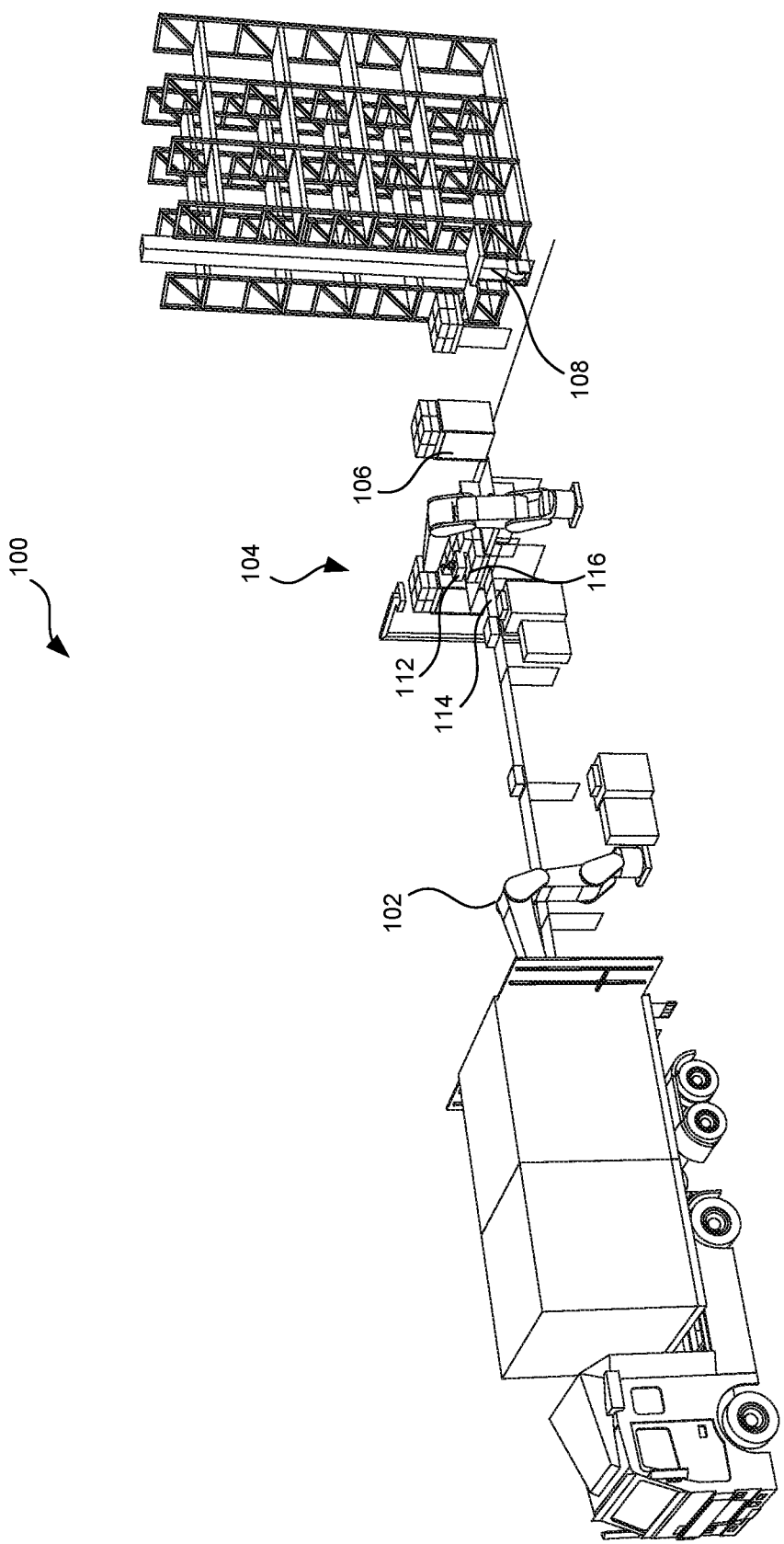
FIG. 1 is an illustration of an example environment of a robotic system 100 with a routing stability mechanism in accordance with one or more embodiments of the present technology.

Systems and methods for allowing robotic units to freely exercise their full range of motion are described herein. For example, a robotic system can include a routing mechanism configured to control locations of control connections (e.g., wires, pneumatic lines/hoses, cables, etc.) relative to moveable structures within a robotic unit (e.g., a robotic arm) and/or an end effector.

An example robotic arm can include, at the proximal end, a base kinetically coupled to a set of links via a corresponding set of joints. Opposite the base, the set of links can be kinetically coupled to the end effector (e.g., grippers or other tools), thereby forming a kinetic chain. The links and joints can be attached to each other via a set of joints that are configured to provide 6 degrees of freedom in moving or positioning the end effector. For example, the robotic arm can include a set of joints between the end effector and one or more adjacent or distal links. The set of joints can be configured to provide rotate and/or move the end effector along and/or about three orthogonal axes relative to the last distal link (e.g., link adjacent to the end effector).

The example robotic arm can include a set of components that are external to the surface of the robotic arm, such as wires, pneumatic lines/hoses, tubes, cables, sleeves, force bearing cables/structures, and the like, configured to control the end effector (described herein as "external components"). The external components can extend from the base and/or one or more of the links to the end effector. In other words, the base can include a circuitry and/or a control system that sends signals and/or mechanical force through the external components to the end effector, such as for operating vacuum grippers on the end effector. The external components can extend along one or more links and across one or more joints. As such, given the mobility range (e.g., the six degrees of freedom) of the robotic arm, the external components may collide with or tangle on internal portions the robotic arm and/or external structures during movement of the robotic arm. The resulting collisions/tangling can cause task errors and/or damage the robotic arm itself (e.g., breaks or disconnections in one or more of the control structures).

The robotic system can include a routing mechanism configured to reduce the collisions/tangling while enabling/ increasing ranges of motions for the robotic arm. The routing mechanism may include a flexible shield or conduit (e.g., a bendable hose or a set of interlocked and moveable ring structures) for housing and securing the external components. The routing mechanism can provide benefits of preventing the external components from interfering with (e.g., colliding, tangling) and/or being damaged by portions of the robotic arm (e.g., joints, links, end effector) and objects that are in the robotic arm's environment.

In some embodiments, the routing mechanism can include a routing conduit, sliding conduit mount, and/or a conduit stability mount. The routing conduit can house or surround the external components. The routing conduit and the housed components can have a default shape/arrangement configured to accommodate the movement of the end effector relative to the links. The sliding conduit mount can mount the routing conduit along one of the links and allow the conduit to move along the corresponding link, thereby keeping the routing conduit relatively constant in comparison to the link. In some embodiments, the conduit stability mount can include ring structures configured to mount the routing conduit in a relatively constant position along or at a portion of the robotic arm regardless of the movement or pose of the arm. In some embodiments, the conduit stability mount can be configured to allow portions of the conduit to slide through the structure. By constantly keeping the routing conduit in stable positions during movement of the robotic arm, the sliding conduit mount and conduit stability mount can control the amount and/or locations of slack in the routing conduit. Accordingly, the routing mechanism can prevent interferences with the motion of the robotic arm motion that can limit its range. Even with unplanned motion and teach-less scenarios, the routing mechanism can enable the robotic arm to utilize full ranges of motion while preventing any obstructions or interferences caused by the external components. The preservation of motion ranges provides further advantages when the robotic arm operates in tight or limited spaces (due to, e.g., barriers or obstructions within the range of motion for the robotic arm). When the movement of the robotic arm becomes limited, higher degree of mobility (e.g., rotational ranges) is necessary to carry out tasks (e.g., palletizing, picking, grasping objects with multiple sides).

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments.

It is to be understood that the various embodiments shown in the FIGS. are merely illustrative representations and are not necessarily drawn to scale. Further, the drawings showing embodiments of the system are semi-diagrammatic, and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

Suitable Environments

FIG. 1 is an illustration of an example environment in which a robotic system 100 with a routing stability mechanism can operate. The operating environment for the robotic system 100 can include one or more structures, such as robots or robotic devices, configured to execute one or more tasks. Aspects of the routing stability mechanism can be practiced or implemented by the various structures.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotic system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves. Details regarding the task and the associated actions are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

Robotic Systems

Figure 2:
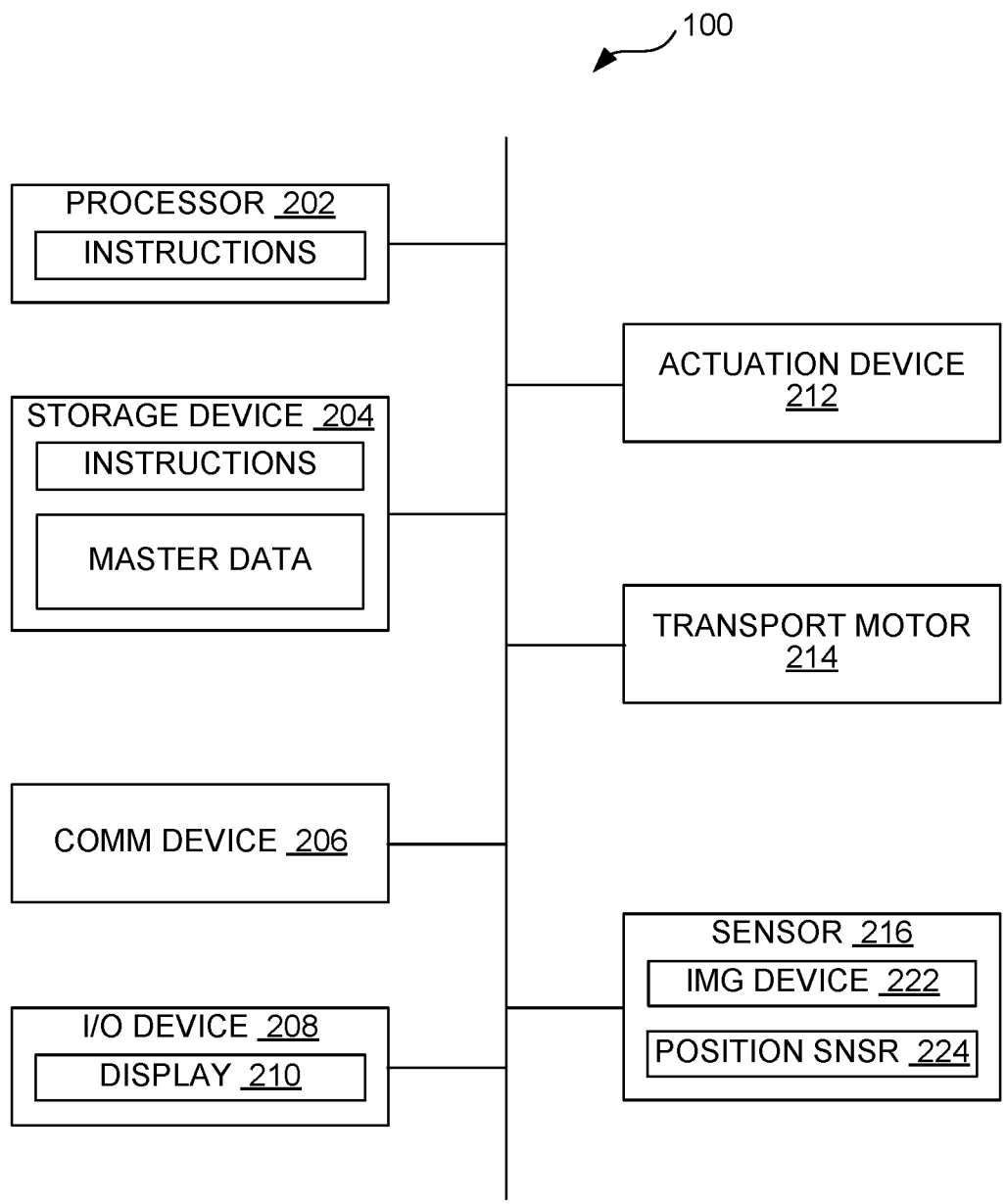
FIG. 2 is a block diagram illustrating components of the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 6G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to master data, processing results, and/or predetermined data/thresholds. For example, the storage devices 204 can store master data that includes descriptions of objects (e.g., boxes, cases, containers, and/or products) that may be manipulated by the robotic system 100. In one or more embodiments, the master data can include a dimension, a shape (e.g., templates for potential poses and/or computer-generated models for recognizing the object in different poses), mass/weight information, a color scheme, an image, identification information (e.g., bar codes, quick response (QR) codes, logos, etc., and/or expected locations thereof), an expected mass or weight, or a combination thereof for the objects expected to be manipulated by the robotic system 100. In some embodiments, the master data can include manipulation-related information regarding the objects, such as a center-of-mass location on each of the objects, expected sensor measurements (e.g., force, torque, pressure, and/or contact measurements) corresponding to one or more actions/maneuvers, or a combination thereof. The robotic system 100 can look up pressure levels (e.g., vacuum levels, suction levels, etc.), gripping/pickup areas (e.g., areas or banks of vacuum grippers to be activated), and other stored master data for controlling transfer robots. The storage devices 204 can also store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or drop locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place. For example, the actuation devices 212 and transport motors connected to or part of a robotic arm, a linear slide, or other robotic component. The robotic system 100 can include corresponding connections, such as for electrical or other physical control/signal communications (e.g., wires, pneumatic lines, force-bearing cables/structure, sleeves, tubes, cables, hoses).

The sensors 216 can be configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., two-dimensional and/or three-dimensional imaging devices). configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image and/or a point cloud, used for implementing machine/computer vision (e.g., for automatic inspection, robot guidance, or other robotic applications).

From the foregoing, it will be appreciated that specific embodiments of the invention have been described herein for purposes of illustration, but that various modifications may be made without deviating from the scope of the invention. Accordingly, the invention is not limited except as by the appended claims.

Robotic Unit

Figure 3B:
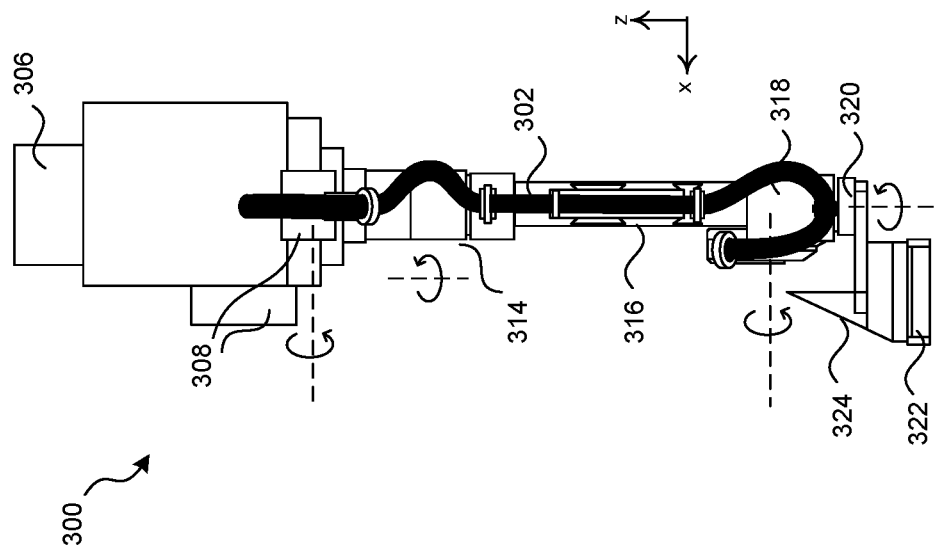
FIGS. 3A and 3B are side views of a robotic unit including an example routing mechanism in accordance with one or more embodiments of the present technology.
Figure 3A:
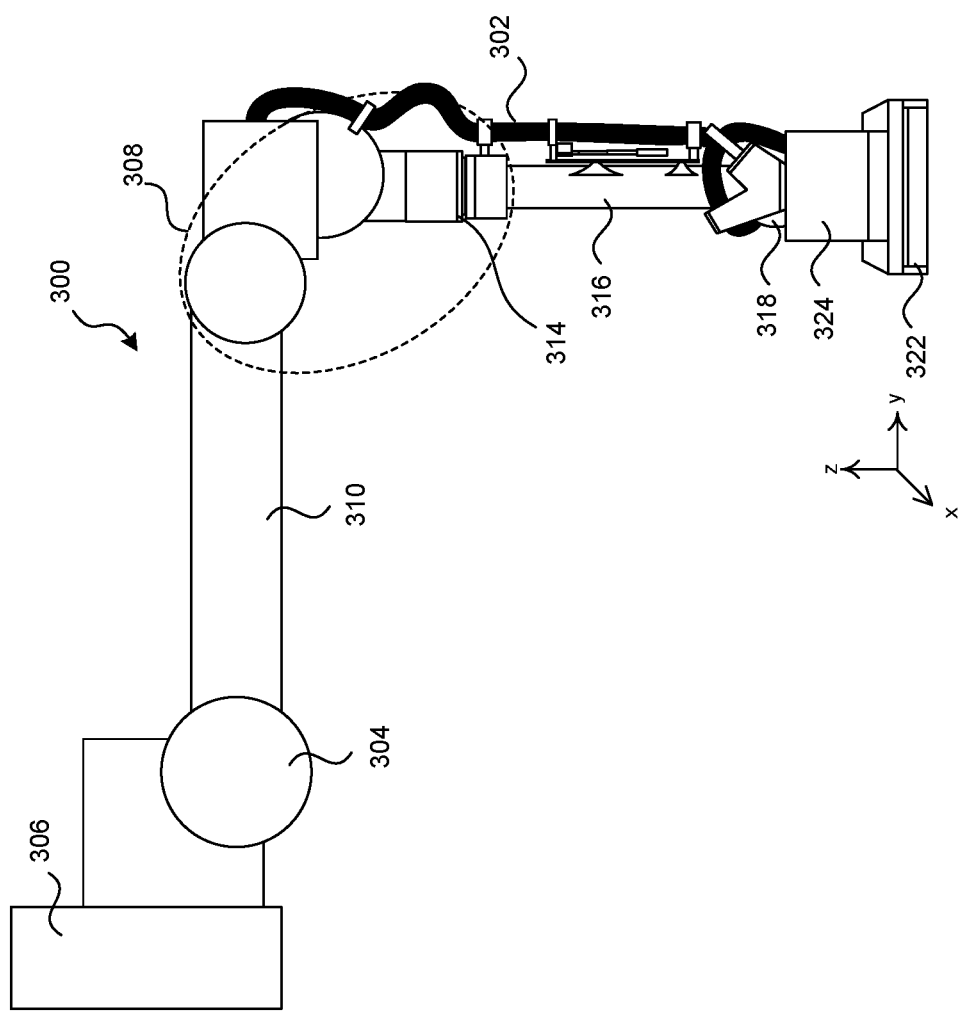

FIGS. 3A and 3B are side views of a robotic unit 300 (e.g., a robotic arm) including an example routing mechanism 302 in accordance with one or more embodiments of the present technology. The robotic unit 300 can include, at the proximal end, a base 306. The base 306 can include a control circuitry (e.g., the one or more processors 202 of FIG. 2) configured to control a movement of the robotic unit 300 and execute tasks (e.g., palletizing, depalletizing, picking, or the like) and/or corresponding motion plans. In some embodiments, the base 306 may be attached to and/or integral with a support fixture that secures or affixes the robotic unit 300 to the operating environment, such as to the floor or a column.

In some embodiments, a three-dimensional coordinate system can be defined for describing locations, poses, movements, and/or translations of objects. For illustrative purposes, a coordinate system is shown with an origin defined by a portion of an end effector 322 at the distal end in FIG. 3A for describing relative locations and movements of the robotic unit 300. Accordingly, various aspects of the robotic unit 300 is described below with reference to the coordinate system having an X-axis and a Y-axis defining orthogonal lateral/horizontal directions and a Z-axis defining a vertical direction. Further, for description purposes, the shape of the robotic units 300 (e.g., relative arrangements of the portions thereof) illustrated in FIGS. 3A and 3B is referred to as a reference pose.

The robotic unit 300 can include a set of structures and joints kinetically connected to and controlled by the base 306. For example, the robotic arm may include a first link 310 connected to the base 306 via a first set of joints 304. The first set of joints 304 can be configured to rotate or move the first link 310 to rotate about one or more of the axes. The first link 310 can extend away from the base 306 and be connected to a second set of joints 308 opposite the base 306. The second set of joints 308 can connect the first link 310 to a second link 316 and be configured to rotate the second link 316 about one or more axes. In some embodiments, the second set of joints 308 can be configured to control an orientation or a pose of the second link 316 relative to the first link 310 and/or an angle between the two links in three-dimensional space.

The second link 316 and/or the second set of joints 308 can include a twist joint 314 configured to rotate a distal portion of the second link 316 about the Z-axis. In other words, the twist joint 314 can rotate the distal portion of the second link 316 along a screw axis (e.g., an axis/direction colinear with the extending orientation of the second link 316). The second set of joints 308 can provide 6 degrees of freedom (6DOF) for the second link 316.

Opposite the second set of joints 308, the second link 316 can be connected to the end effector 322 (e.g., a gripper) through a distal set of joints. The distal set of joints can be configured to rotate the end effector 322 about one or more axes. In some embodiments, the distal set of joints and/or the twist joint 314 can provide 6DOF for the end effector 322 relative to the second link 316. For example, the distal set of joints can include a distal-angular joint 318 configured to rotate the end effector 322 about an axis (e.g., the X-axis of the coordinate system in FIGS. 3A and 3B). The distal-twist joint 320 can be a revolute joint or a screw joint that allows the end effector 322 to rotate about a screw axis thereof (e.g., the Z-axis for the reference pose).

For the reference pose, the end effector 322 can include a gripping interface/surface that is oriented orthogonal to the twist axis or the length of the second link 316 and faces away from the second link 316. The distal-angular joint 318 can be configured to control an angle formed between the gripping surface and the second link 316, and the distal-twist joint 320 can be configured to rotate the end effector 322 and/or the gripping surface about or around the length/twist axis of the distal set of joints. Accordingly, the distal set of joints can allow the end effector 322 to cover a three-dimensional plane spanned by the X-axis, Y-axis, and Z-axis. Together, the base 306, the two links, the six joints, and the end effector 322, the robotic unit 300 can cover a wide range of motion for positioning the end effector 322.

In one or more embodiments, the distal set of joints can directly attach the distal link (e.g., the second link 316) to the end effector 322. In other embodiments, an offset link can connect the end effector 322 to the distal set of joints. When the robotic unit 300 is in the reference pose, the offset link can extend along a direction orthogonal to the second link 316, thereby separating the end effector 322 or a portion thereof (e.g., the calibration board 324) from the twist axis of the distal set of joints by a separation length. The offset link may be rigidly or rotatably connected to the end effector 322 (e.g., at a top portion thereof). The offset link may be attached to the distal set of joints opposite the second link 316.

The end effector 322 can consist of grippers or tools used to grip objects (e.g., the target object 112 of FIG. 1). Types of grippers or tools used can include finger/pinch grippers, vacuum grippers, electromagnets, and/or hydraulic grippers. Once the objects are retained or grasped by the end effector 322, the robotic unit 300 can move to transfer the retained objects to desired locations. In some embodiments, the end effector 322 can include a calibration board 324, which the robotic unit 300 can use to calibrate the position of the end effector 322 in three-dimensional space.

The routing mechanism 302 can be attached to the second link 316 and configured to maintain external components (e.g., control connections) along a predetermined path across movement of the link and/or the end effector. The routing mechanism 302 can house and secure external components (e.g., wires, pneumatic lines/hoses, tubes, cables, sleeves, force bearing cables/structures) that extend from the base 306, the first link 310, and/or the second link 316 to the end effector 322. For example, the routing mechanism 302 can surround and affix control connections used to operate the gripper, such as to grasp and release the target object 112.

The external components can extend along a set of links and/or joints of the robotic unit 300. As such, when the robotic unit 300 exercises its range of mobility without the routing mechanism 302, the external components may collide with or tangle on one or more of the links, the joints, the base 306, the end effector 322, and/or other internal or external structures. Such collisions and entanglements can interfere with the operation of the robotic unit 300, causing task errors and/or damages to the robotic unit 300. For example, collisions and entanglements can break or disconnect the control structures. As another example, the external components may collide with objects such as boxes or containers in the environment of the robotic unit 300 as the links move across the three-dimensional space to transfer objects. Also, without the routing mechanism, the range/sequence of motion of the robotic unit 300 may require limitations to avoid such collisions and entanglements, thereby reducing the range or altering the shape of otherwise reachable workspace.

The routing mechanism 302 can reposition (such as by reshaping or rearranging in three-dimensional space) the external components in real-time to adapt to the movement or pose of the robotic unit 300. In other words, the routing mechanism 302 can retain the external components within a stable or predetermined range of positions relative to the links and/or joints of the robotic unit 300. Accordingly, the routing mechanism 302 can prevent the external components from colliding with or tangling on unintended structures. By reducing the collision/tangling events, the routing mechanism 302 can increase the range of motion for the robotic unit 300 even for unplanned motions and/or teach-less applications. By preserving the full mechanical range of motion, the robotic unit 300 can exercise a full range of movement with six-degrees of freedom. This can provide further advantage when the robotic unit 300 executes tasks in tight, narrow, or limited spaces (such as due to barriers or obstructions within the full range of motion).

Routing Mechanism

Figure 4:
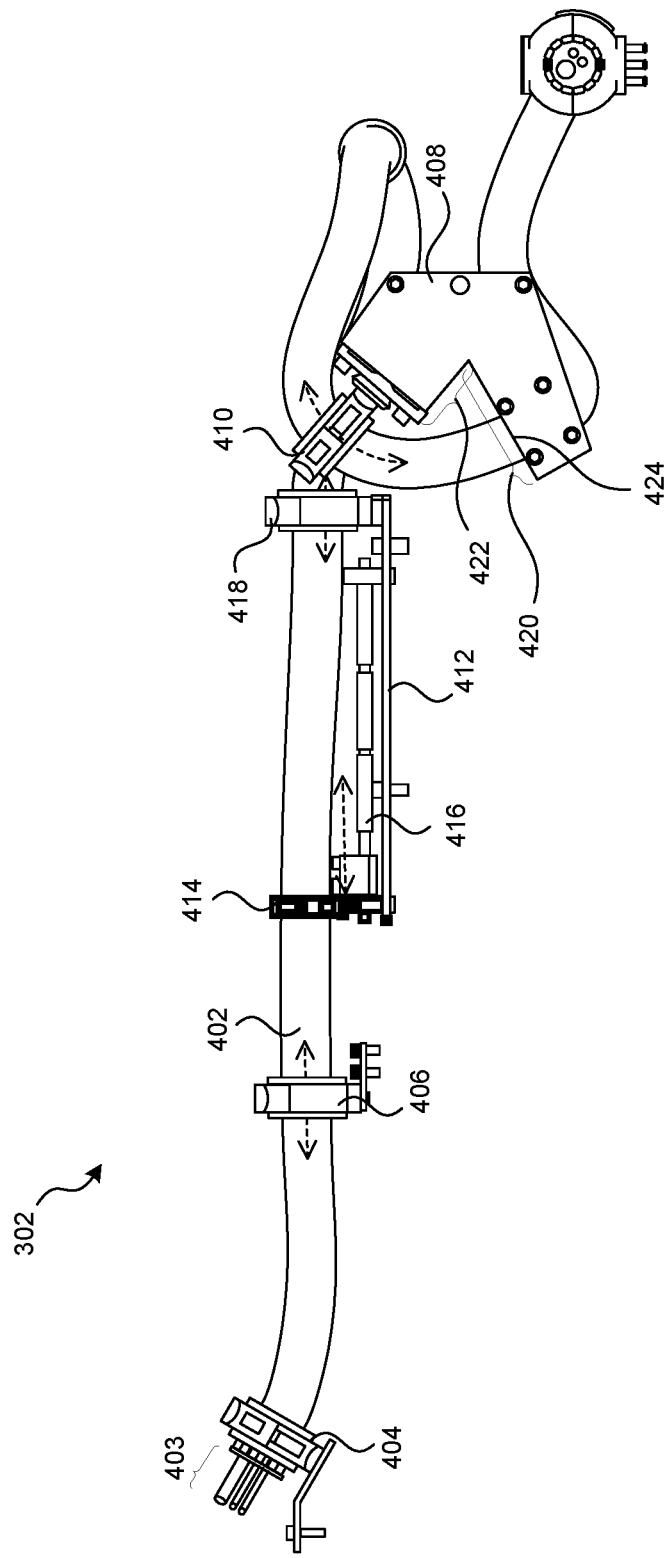
FIG. 4 is a plan view of the routing mechanism for the robotic system of FIG. 1 in accordance with one or more embodiments of the present technology.

FIG. 4 is a plan view of the routing mechanism 302 for the robotic system of FIG. 1 in accordance with one or more embodiments of the present technology. The routing mechanism 302 can include a routing conduit 402. The routing conduit 402 can be a flexible housing structure, such as a metallic conduit and/or a non-metallic (e.g., PVC, rubber, plastic) tubing/sleeve. The routing conduit 402 may be configured to house or at least partially surround external components 403 (e.g., air/vacuum tubes, electrical cables, or a combination thereof located external to the links and/or the joints of the robotic unit 300). For example, the external components 403 can include control connections connected to the end effector 322 and configured to provide control signals for operating the end effector 322. The external components 403 can include hoses configured to provide or relay vacuum forces to suction pads on the end effector 322, electrical wires configured to provide activation signals to actuator on the end effector 322, and the like. Accordingly, the routing conduit 402 can provide a covering and/or a container for holding and/or guiding the external components 403. The routing conduit 402 can extend with the external components 403 along at least a portion of a length the second link 316, across one or more sets of joints, and/or to the end effector 322.

The routing mechanism 302 can include one or more structural components configured to secure the routing conduit 402 to the robotic unit 300. In some embodiments, the routing mechanism 302 can include connectors such as guide brackets 404 and 406 that may be rigidly attached to the robotic unit 300 (e.g., at predetermined locations on links and/or joints thereof). The guide brackets 404 and 406 may be attached to the robotic unit 300 via corresponding joints (e.g., ball-socket joints) that provide a predetermined or limited range of motion for the brackets relative to the robotic unit 300.

One or more of the guide brackets 404 and 406 may surround or encircle the routing conduit 402 without attaching thereto (via, e.g., a ring-shape). Accordingly, such guide brackets 404 and/or 406 can allow the routing conduit 402 to pass, slide, and/or extend through along a predictable path/direction. The guide brackets 404 and 406 can be configured to control the location of the of the routing conduit 402 at or within a threshold distance from corresponding joints.

As an illustrative example, the guide bracket 404 can be attached to the second link 316 at the proximal end thereof and/or can keep the routing conduit 402 in a fixed position relative the second set of joints 308 of FIG. 3A. The guide bracket 406 can be attached to the second link 316 between the guide bracket 404 and the distal end. Also, the guide bracket 406 can be attached closer to the proximal portion of the second link 316 and/or adjacent to the twist joint 314. Accordingly, the guide bracket 406 can allow the routing conduit 402 or a slack portion thereof to slide through when the remaining distal portions are moved about one or more corresponding joints, such as when the distal portion of the second link 316 is twisted about the screw axis. By allow the routing conduit 402 to slide through it, the guide bracket 406 can keep or guide the routing conduit 402 to move about a known/fixed point or path during movement of the robotic unit 300 (e.g., the first and second links). The guide brackets 404 and/or 406 can keep the routing conduit 402 from unexpectedly colliding or tangling with the links or joints of the robotic unit 300, or other objects in the workspace of the robotic unit 300 during movement about the corresponding joints.

In some embodiments, the routing mechanism 302 can include a conduit stability mount 408. The conduit stability mount 408 can be configured to attach to a structural member of the robotic unit 300 (e.g., the second link 316 and/or the distal set of joints) at or near the distal end (e.g., within a distal 5%-50% portion of the arm). The conduit stability mount 408 can include a structure that provides a basis or a reference for a set of conduit-guide mechanisms (e.g., brackets, guides, and the like). In some embodiments, the conduit stability mount 408 can have a first protrusion (e.g., a linear portion) 420 and a second protrusion (e.g., a linear portion) 422 extending away from each other at an angle less than 180 degrees.

The conduit stability mount 408 can be attached to a pivotable bracket 410 configured to guide the routing conduit 402. For example, the pivotable bracket 410 can encircle or surround the routing conduit 402 (by, e.g., having a ring shape) without directly attaching thereto, thus allowing the routing conduit 402 to pass through at a known or fixed location relative to the end effector 322 and/or the second link 316. The pivotable bracket 410 can be attached to an end portion of the second linear portion 422 and extend generally colinear with the second linear portion 422. The pivotable bracket 410 may be rotatably attached to the second linear portion 422 and be configured to rotate or pivot (e.g., the pass-through opening) about an axis that is colinear with the second linear portion 422. In some embodiments, the pivotable bracket 410 can be configured to pivot along multiple axes, such as via a ball-socket joint. The pivotable bracket 410 can pivot to adjust the orientation and positioning of the routing conduit 402 near the distal end to account for movements about the distal set of joints. The pivotable bracket 410 can also allow the routing conduit 402 to slide freely through as the end effector 322 is moved or rotated about the distal set of joints.

The first linear portion 420 can include a guide opening 424 at a distal portion thereof. The guide opening 424 can at least partially surround the routing conduit 402 without directly attaching or affixing thereto. The guide opening 424 can have a fixed orientation (e.g., orthogonal to the length of the first linear portion 420). The guide opening 424 can be configured to direct movement of portions of the routing conduit 402 closest to the end effector 322 along a path that is fixed relative to the end effector 322, the second link 316, and/or the distal set of joints.

Accordingly, the conduit stability mount 408 can provide a path for the routing conduit 402 that is relatively constant in position or distance from the robotic unit 300 or predetermined portions thereof (e.g., the guide locations). The pivotable bracket 410 can prevent the routing conduit 402 from inadvertent contact with the end effector 322, the gripper, the calibration board 324, the links, or other objects in the environment around the robotic unit 300. As opposed to routine or fixed trajectories, the robotic system 100 can implement or utilize teach-less motion planning based on the routing mechanism 302 with the conduit stability mount 408, which can utilize the full range of motion physical possible for the robotic unit 300 while maintaining a stable position of the routing conduit 402.

In some embodiments, the routing mechanism 302 can include a sliding conduit mount 412. The sliding conduit mount 412 can be attached to a structural member of the robotic unit 300, such as the second link 316. The sliding conduit mount 412 may be attached across the distal set of joints from the end effector 322, such as between the guide bracket 406 and the pivotable bracket 410. The sliding conduit mount 412 can include, attached on one end, a guide bracket 418 (e.g., a fixed bracket located at or over a distal portion of the link) that can keeps and guides the routing conduit 402 along a relatively fixed path about the distal set of joints.

The sliding conduit mount 412 can include, a sliding bracket 414 attached to the sliding conduit mount 412 by a rail mechanism 416. The sliding bracket 414 may be fixed (e.g., attached or claimed) to a portion or a position of the routing conduit 402 such that the routing conduit 402 is prevented from freely sliding through the sliding bracket 414. The rail mechanism 416 (e.g., a set of parallel rails) can extend parallel to the length of the second link 316, and the guide bracket 418 can be configured to linearly move or slide along the rail mechanism 416. The sliding conduit mount 412 can be biased (via, e.g., a spring-loaded mechanism at or coupled to the rail mechanism 416) to return the guide bracket 418 to a default position, such as the proximate end of the rail mechanism 416 (e.g., a portion thereof closest to the guide bracket 406). The routing conduit 402 or the portion thereof attached to the sliding conduit mount 412 can traverse or be limited to a predetermined linear path along the second link 316 during the motion of the robotic unit 300. For example, the sliding bracket 414 can traverse at least a part of the length of the rail mechanism 416 to feed and retract the routing conduit 402 when various joints of the robotic unit 300 rotate and cause the links and/or end effector 322 to change positions. The sliding bracket 414 can also control a location for the slack in the routing conduit 402, such as away from the distal set of joints and/or between the second set of joints 308 and the sliding bracket 414.

The routing mechanism 302 including the sliding conduit mount 412 and the conduit stability mount 408 can provide robust attachment of the routing conduit 402 to the robotic unit 300. The conduit stability mount 408 and sliding conduit mount 412 can preserve and/or increase the motion range of the robotic unit 300 by controlling the amount and/or locations of slack in the routing conduit 402 and constantly keeping it in stable positions. More specifically, the conduit stability mount 408 and sliding conduit mount 412 can keep the routing conduit 402 in a constant position and distance from structural members as the robotic unit 300 is moving, which can prevent interferences and collisions. Furthermore, the conduit stability mount 408 and sliding conduit mount 412 can reduce the fatigue on connection points for the routing conduit 402 where brackets are located, which can extend the operational life of the routing conduit before failure or need for repair.

Figure 5:
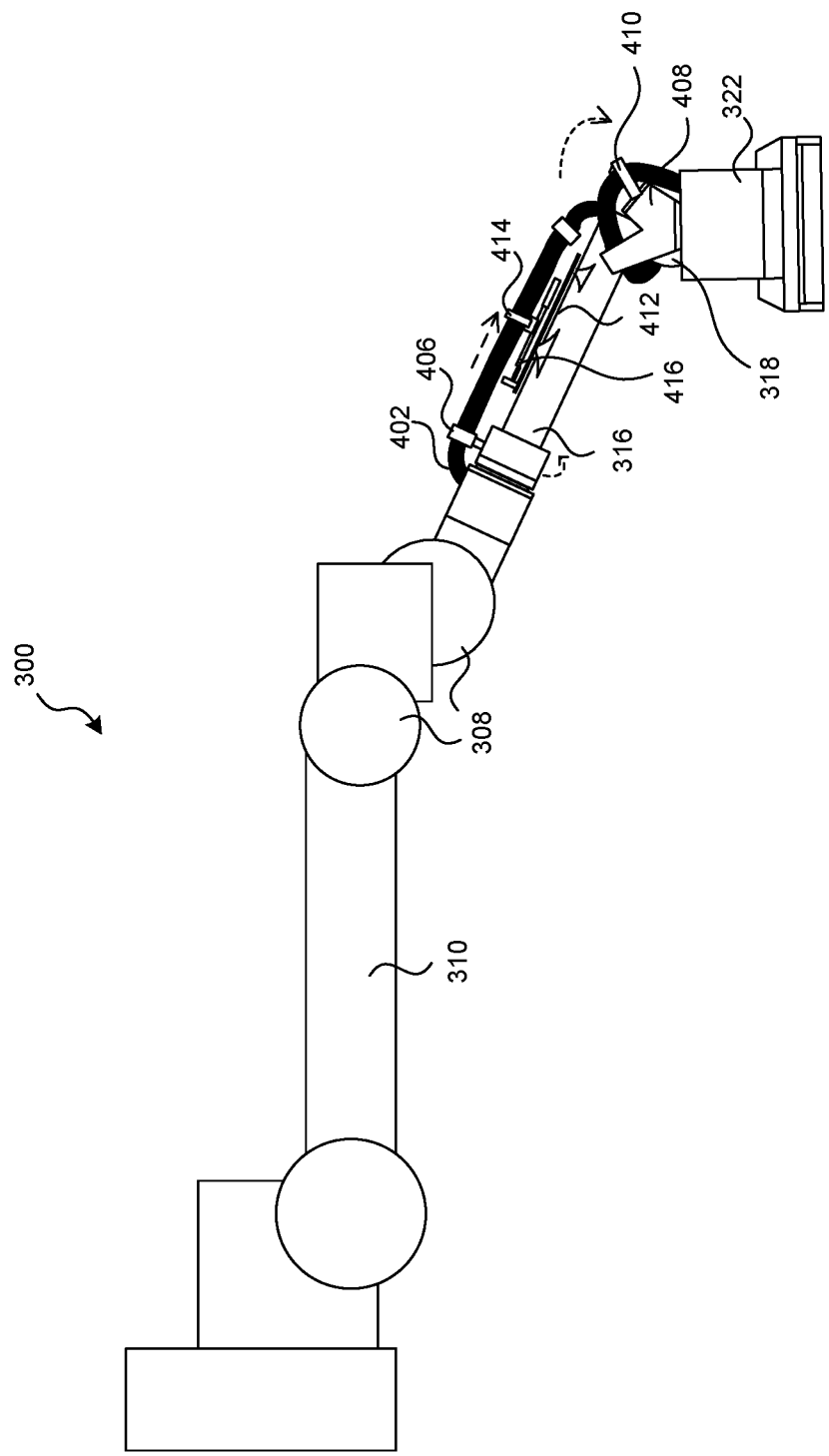
FIG. 5 is a side view of the robotic unit in an example configuration in accordance with one or more embodiments of the present technology.
Figure 6D:
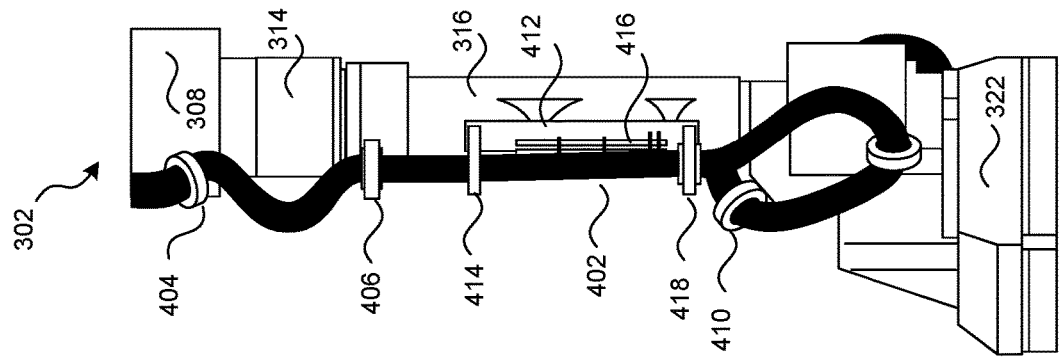
FIGS. 6A-6H are rotating views of the routing mechanism in accordance with one or more embodiments of the present technology.
Figure 6C:
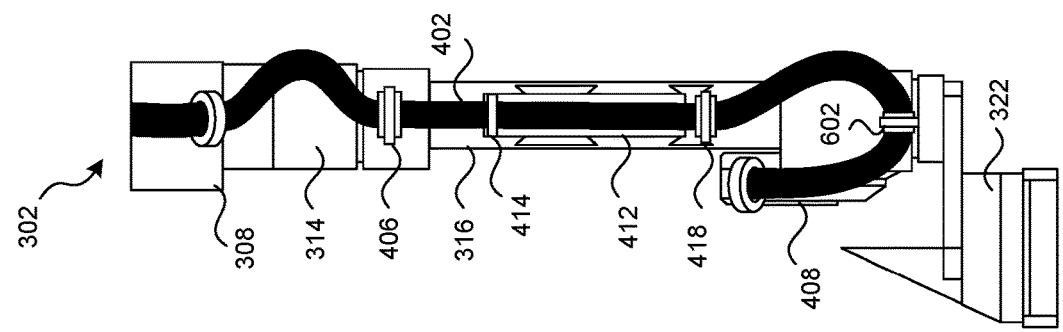
Figure 6B:
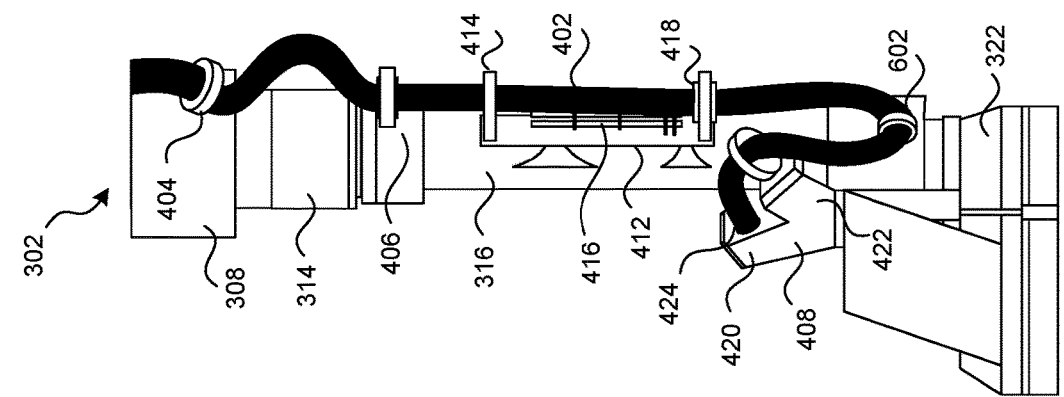
Figure 6A:
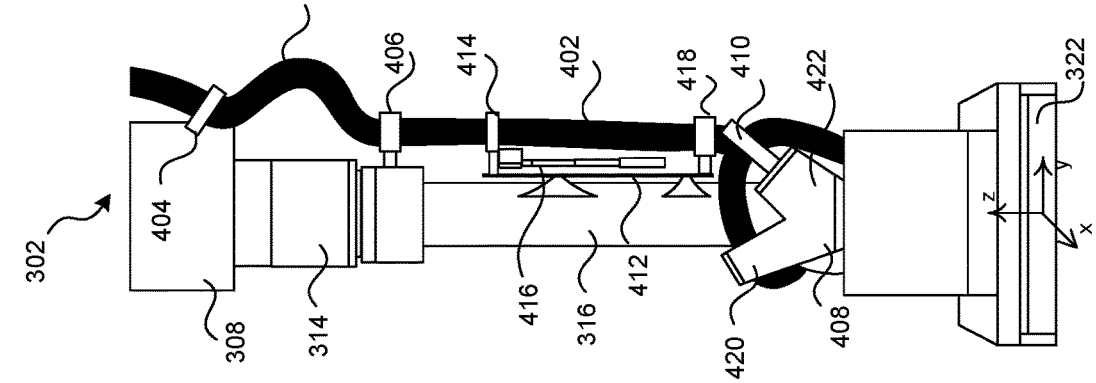
Figure 6H:
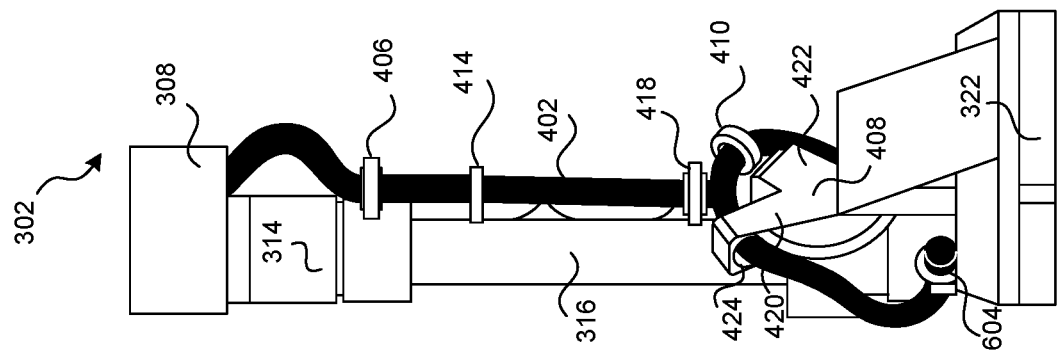
Figure 6G:
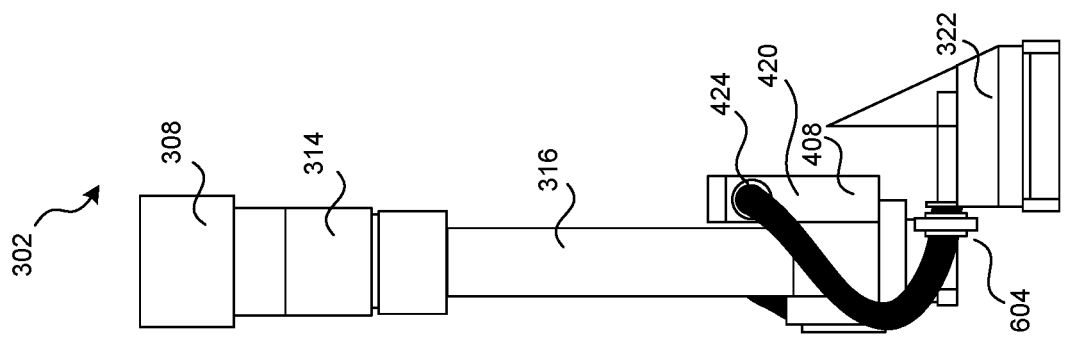
Figure 6F:
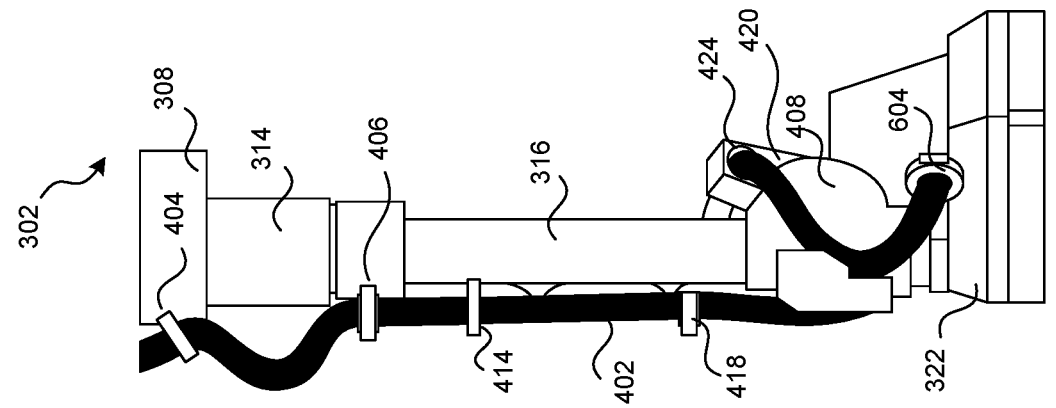
Figure 6E:
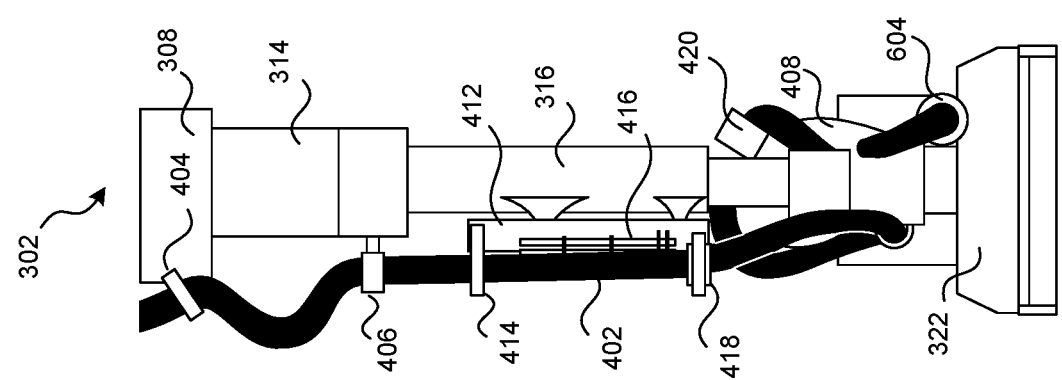

FIG. 5 is a side view of the robotic unit 300 in an example configuration in accordance with one or more embodiments of the present technology. The example configuration can correspond to the links rotating about the second set of joints 308 and/or the distal-angular joint 318. The rotation about the joints can change the angles between the adjoining links and the effective travel distance around the joints. When the effective travel distances increase, such as when the angles of the adjoining links exceed 180 degrees, the external components 403 of FIG. 4 extending along the two links can become taught. For the example illustrated in FIG. 5, the twist joint 314 and/or the distal-twist joint 320 can rotate to cause the external components 403 and the routing conduit 402 to further wrap (by, e.g., increasing the number or a degree of turns) about the second link 316. Also, the distal-angular joint 318 can rotate the end effector 322 to increase the travel distance for the external components. Accordingly, the external components 403 or portions thereof can move relative to the links/joints as a result of moving the robotic unit 300 to maintain the connection to the end effector 322 across the changing travel distance. Accommodating the movement can require control or adjustment of the amount and location of slack in the routing conduit 402 and the external components.

The sliding conduit mount 412 can control the amount and/or location of slack in the routing conduit 402 in response to the change in position of the second link 316 from the first link 310. The sliding bracket 414 can in real-time traverse at least a portion of the length of the rail mechanism 416 toward the distal end and while moving the routing conduit 402 and the external components 403 therein along a linear path parallel to the second link 316 during the movement about the joints. As the routing conduit 402 retracts, the portion of the routing conduit 402 (e.g., the slack portion) between the guide brackets 404 and/or 406 can pass, slide, and/or extend through and move away from the proximal end of the second link 316. The amount of slack in the routing conduit 402 between the guide brackets 404 and 406 can, as a result, decrease. By adjusting the routing conduit 402, the sliding conduit mount 412 can keep the routing conduit 402 along a constant path and within a predetermined distance from structural members (e.g., the two links, second set of joints 308, end effector 322) as the second link 316 and/or end effector 322 move about the joints. Such control can prevent interferences and collisions of the external components 403 with the structural members of the robotic unit 300, as well as damages to the external components 403 themselves when the second set of joints 308 are moving.

The conduit stability mount 408 can further control the position/shape of the routing conduit 402 in response to the movements and the change in travel distance. The pivotable bracket 410 can in real-time rotate or pivot about multiple axes along with the movement of the second link 316 and/or the end effector 322. Accordingly, the pivotable bracket 410 can maintain the travel path of the routing conduit 402 constant about a reference location (e.g., the attachment location of the pivotable bracket 410 to the conduit stability mount 408). As shown in FIG. 5, the pivotable bracket 410 can pivot or rotate to allow the routing conduit 402 to slide freely through as the travel distance between the end effector 322 and the distal end of the second link 316 changes. The conduit stability mount 408 can thus keep the routing conduit 402 away from structural members (e.g., second link 316, distal set of joints, end effector 322) during movement of the robotic unit 300.

FIGS. 6A-6H are rotating views of a portion of the routing mechanism 302 in accordance with one or more embodiments of the present technology. FIGS. 6A-6H illustrate the routing mechanism 302 from different viewing angles/perspectives. For example, FIGS. 6A-6H can correspond to successively rotating the view point about the Z-axis by 45 degrees.

Referring now to FIGS. 6A-6H together, the guide bracket 404 can be connected at or near a top portion of the second set of joints 308. The guide bracket 406 can be connected at or within a proximal half of the second link 316.

In some embodiments, the routing conduit 402 can have a slack portion 601 (e.g., a portion configured to account for the change in travel distance) between the guide brackets 404 and 406. The slack portion 601 can be maintained at or within a predetermined area, such as within the top/distal portion of the second link 316, based on the sliding conduit mount 412 (via, e.g., the spring-load or other default biasing mechanism therein). When the travel distance for the external components 403 of FIG. 4 is less than the actual length thereof, such as when the robotic unit 300 is in the reference pose, the slack portion 601 can partially extend or loop away from the second link 316. When the travel distance increases, the slack of the routing conduit 402 between the guide brackets 404 and 406 can change in amount and/or location. For example, the amount of protrusion of the slack portion 601 can change depending on the movement of the robotic unit 300 and the change in travel distance. By maintaining the slack portion 601 within a predetermined area and/or away from the end effector 322, the routing mechanism 302 can prevent the routing conduit 402 and the external components 403 from unexpectedly colliding with or tanging on other objects or structures.

In some embodiments, the routing mechanism 302 can be configured to maintain a generally linear and/or helix/spiral shape or pose of the routing conduit 402 and the external components. Rotation of the second link 316 via the twist joint 314 can cause the relative positioning/alignment of the guide brackets 404 and 406 to change, thereby causing the corresponding section of the routing conduit 402 to wrap or spiral around the second link 316 and/or the twist joint 314. The sliding conduit mount 412 can maintain the linear pose for the section of the routing conduit 402 between the guide brackets 406 and 418. From the guide bracket 418, the routing conduit 402 extend down and then curve upward to form a "U-shape" before extending through the pivotable bracket 410. The U-shape portion can be fixed relative to the distal set of joints via a guide bracket 602 (e.g., a distal joint bracket) that is rotatably attached or fixed to the set of distal joints. The routing conduit 402 can pass, slide, and/or extend through the guide bracket 602 located between the end effector 322 and the guide bracket 418 along the kinetic chain. Accordingly, the guide bracket 602 can be located at a bottom of and maintain the "U-shape," which can be used to further accommodate the change in travel distance about the distal set of joints while maintaining a known travel path for the routing conduit 402 For example, a separation between the top portions of the "U-shape" can widen, narrow, and/or move away from the distal set of joints depending on the movement about the distal set of joints but the general shape may be preserved between the brackets.

Based on the relative locations/orientations of the pivotable bracket 410 and the guide opening 424, the corresponding portion of the routing conduit 402 can curve and extend (e.g., laterally and/or downward) away from the U-shaped portion. The pivotable bracket 410 and the guide opening 424 can maintain a pose of a distal portion of the routing conduit 402 generally fixed relative to the end effector 322. Accordingly, the routing mechanism 302 can reduce or remove the stress caused by the movement of the robotic unit 300 on a connection between the external components 403 and the end effector 322. Thus, the routing mechanism 302 can further reduce or prevent stress-related breaks or disconnections of the external components 403 from the end effector 322.

The routing conduit 402 can be attached and/or fixed to the end effector 322 via a terminal bracket 604. The terminal bracket 604 may be attached to the end effector 322. The terminal bracket 604 can also fix the distal end of the routing conduit 402 to the end effector 322, such as at a location away from the calibration board 324. As the end effector 322 moves relative to the second link 316, the terminal bracket 604 can maintain a shape or a pose for the routing conduit 402 (e.g., a curve shown in FIGS. 6F-6H). The curve in the distal portion of the routing conduit 402 can represent slack in the routing conduit 402 that can be located between the conduit stability mount 408 and the end effector 322. The curve can protrude away from the end effector 322 based on the fixed orientation of the terminal bracket 604. When the distal set of joints rotate, the curve in the terminal portion of the routing conduit 402 can change in shape and/or location. For example, the distance between the end portions of the "C-shape" can widen, narrow, or move away from the end effector 322 depending the movement, while maintaining the slack portion away from the end effector 322 to prevent collisions and entanglements.

Figure 7C:
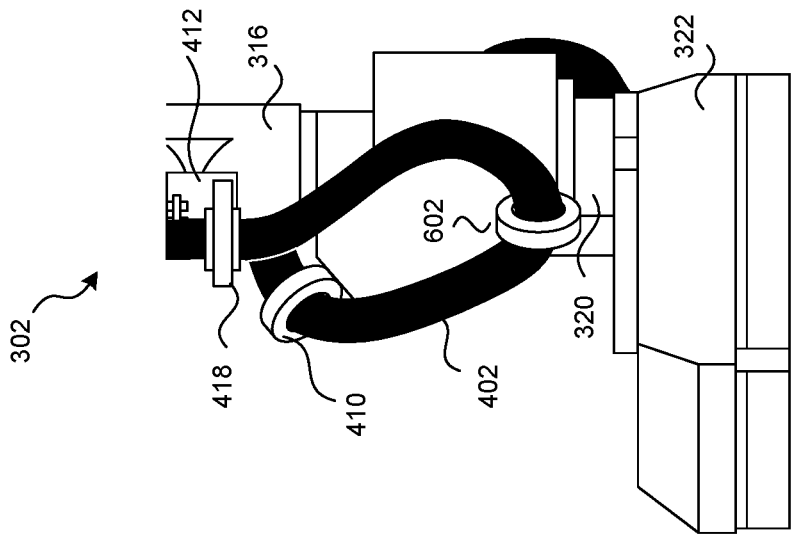
FIGS. 7A-7C are detailed views of the routing mechanism in accordance with one or more embodiments of the present technology.
Figure 7B:
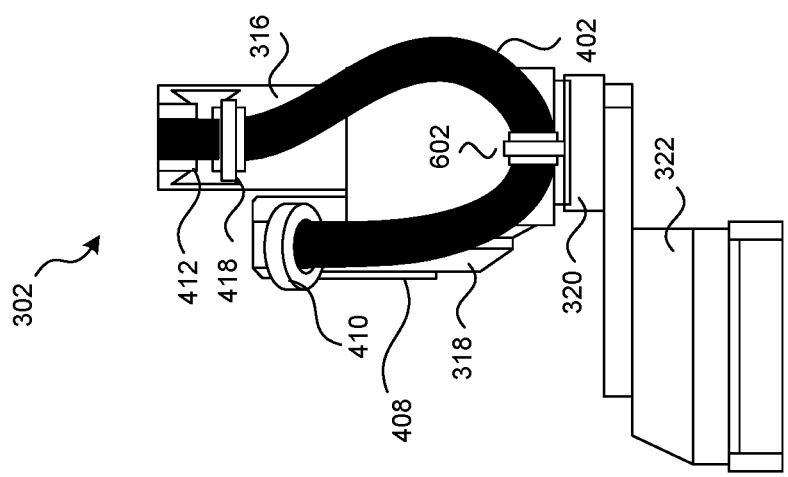
Figure 7A:
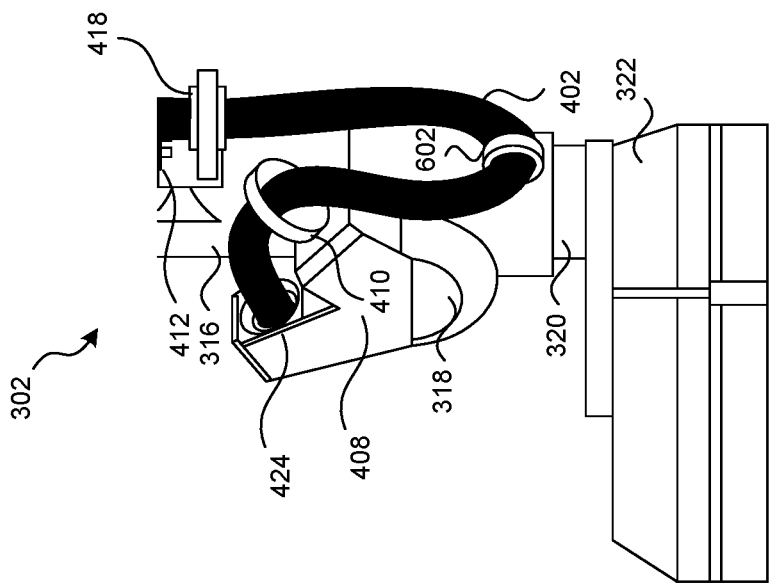
Figure 8B:
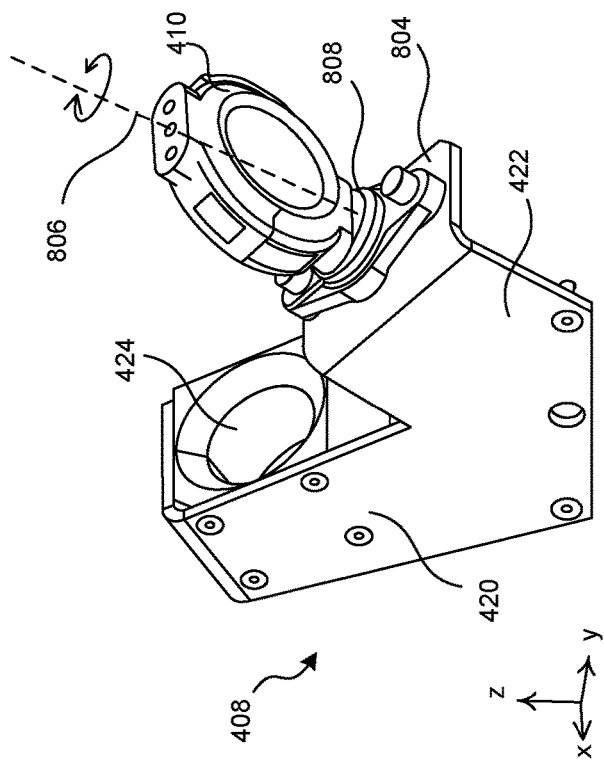
FIGS. 8A-8H are detailed views of an example conduit stability mount in accordance with one or more embodiments of the present technology.
Figure 8C:
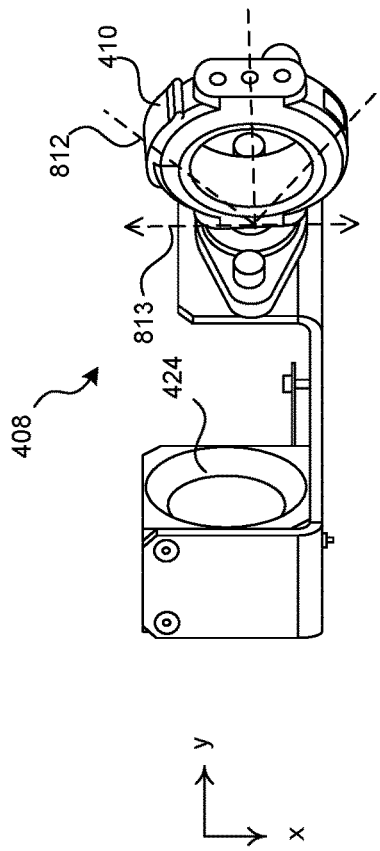
Figure 8A:
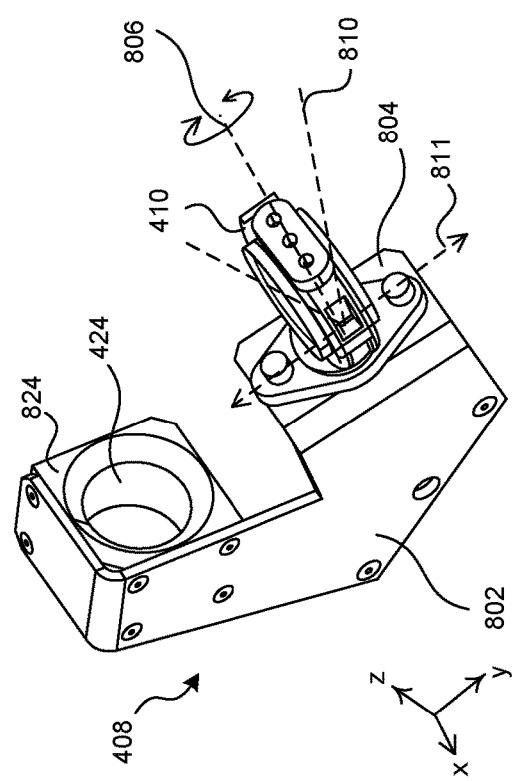
Figure 8E:
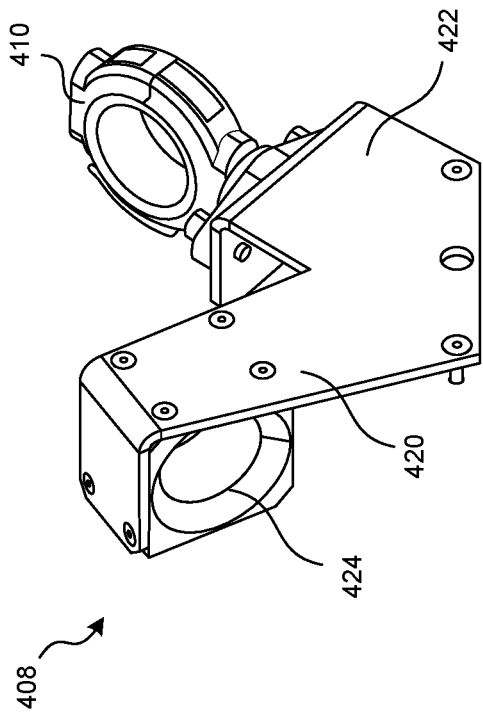
Figure 8F:
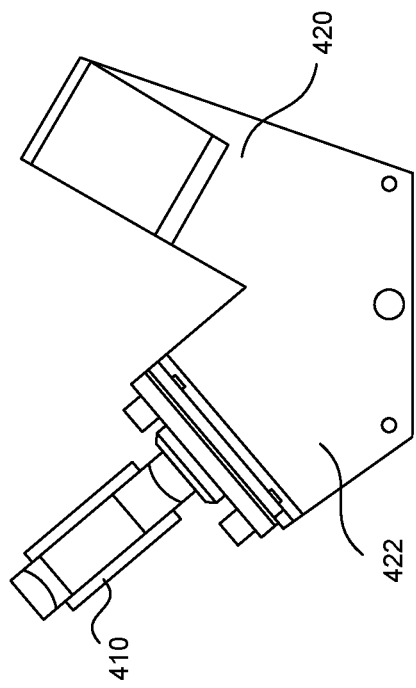
Figure 8D:
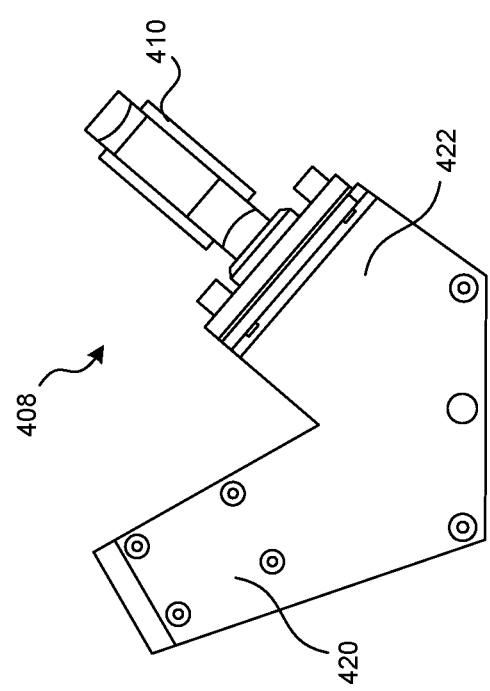
Figure 8H:
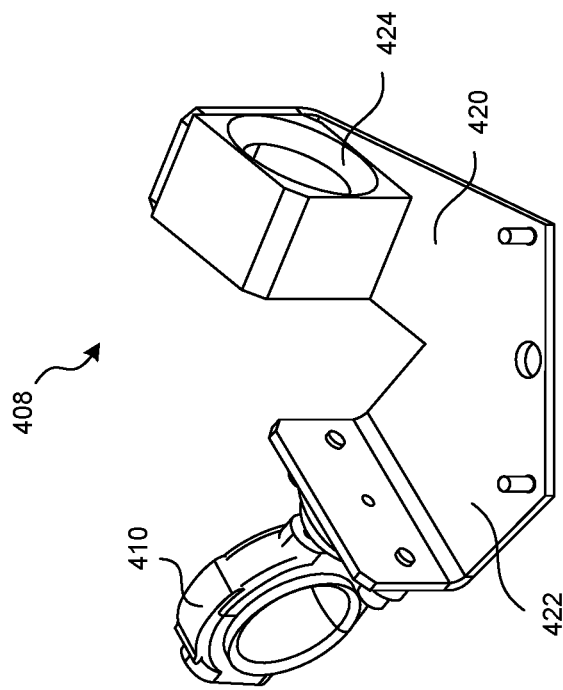
Figure 8G:
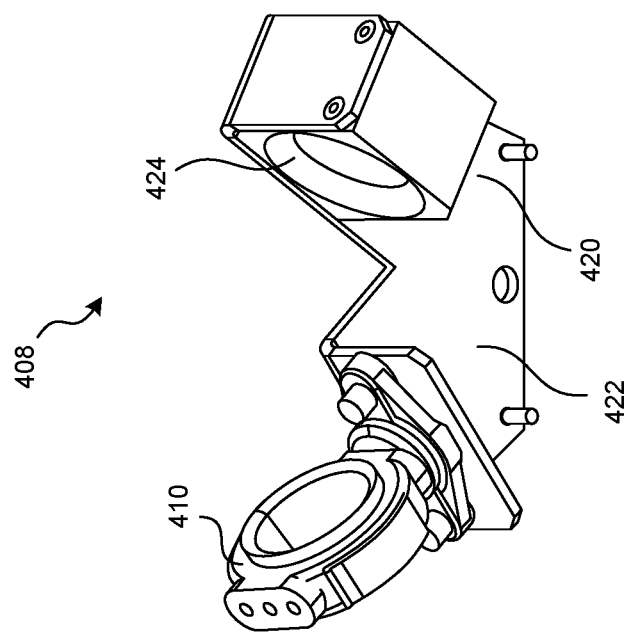
Figure 9D:
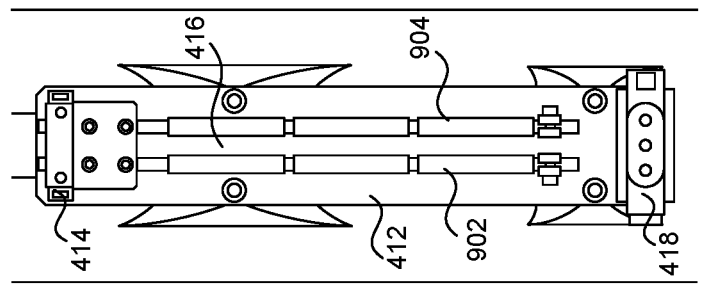
FIGS. 9A-9D are detailed views of an example sliding conduit mount in accordance with one or more embodiments of the present technology.
Figure 9C:
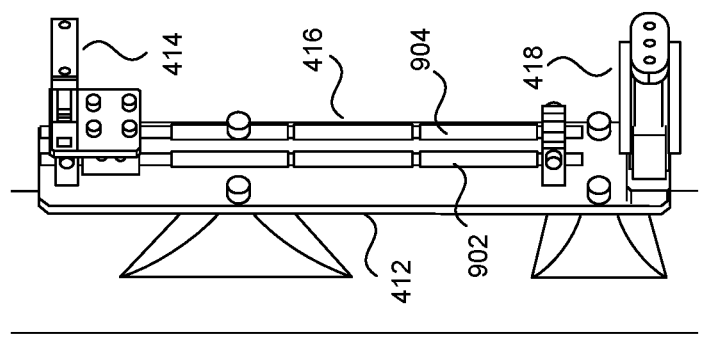
Figure 9B:
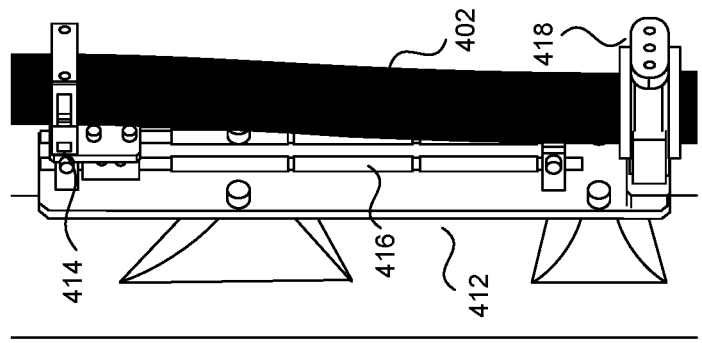
Figure 9A:
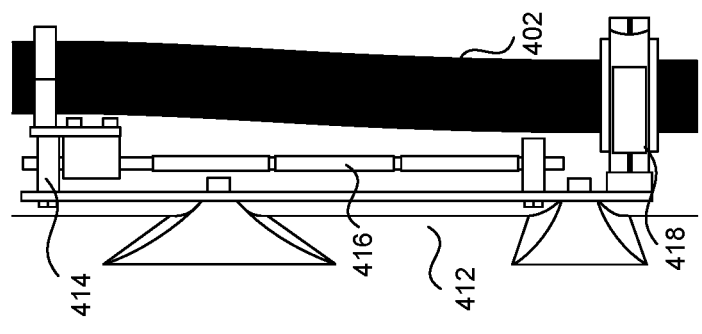

FIGS. 7A-7C are detailed views (e.g., for a terminal or distal portion) of the routing mechanism 302 in accordance with one or more embodiments of the present technology. FIGS. 7A-7C can illustrate the routing mechanism 302 from different viewing angles successively rotated about the Z-axis.

Referring to FIGS. 7A-7C together, the routing mechanism 302 can guide the routing conduit 402 and the external components 403 of FIG. 4 toward the distal direction (e.g., down) from the guide bracket 418, then along an orthogonal direction (e.g., lateral) via the guide bracket 602 as described above. The movement of the end effector 322 relative to the second link 316 can move the pivotable bracket 410 to different locations relative to the guide bracket 602. Accordingly, the pose for a first segment of the routing conduit 402 between the guide bracket 602 and the pivotable bracket 410 can change relative to a second portion between the guide brackets 602 and 418. Across the changing relative poses, the routing mechanism 302 can maintain the routing conduit 402 within a predetermined zone or distance from the structural components (e.g., links and joints) of the robotic unit 300.

Conduit Stability Mount

FIGS. 8A-8H are detailed views of an example conduit stability mount in accordance with one or more embodiments of the present technology. FIGS. 8A-8H can illustrate the conduit stability mount 408 from different viewing angles/perspectives.

The conduit stability mount 408 can be configured to attach (via, e.g., fasteners, screws, nuts, bolts, rivets, nails, and/or mounts) to a structural member of the robotic unit 300, such as the second link 316 and/or the distal set of joints. In some embodiments, the conduit stability mount 408 can include a planar frame 802 having a shape (e.g., a "V" shape) that defines the first linear portion 420 and the second linear portion 422 extending away from each other at an angle less than 180 degrees. The planar frame 802 can be integral with a bracket interface portion 804 that extends away from the planar frame 802 along an orthogonal direction. For example, the planar frame 802 can extend across the z-y plane and the bracket interface portion 804 can extend along the x axis.

The pivotable bracket 410 can be attached (via, e.g., fasteners, screws, nuts, bolts, rivets, nails, and/or mounts) to a top surface of the bracket interface portion 804. The pivotable bracket 410 can extend generally colinear with the second linear portion 422 and have a twist axis 806 that is parallel with the second linear portion 422 and/or orthogonal to the bracket interface portion 804. In some embodiments, the pivotable bracket 410 can also be configured to pivot along multiple axes about an attachment joint 808 (via, e.g., a ball-socket joint). In other words, the twist axis 806 can tilt or swivel about the attachment joint 808 within a first threshold range 810 across a first plane 811 (e.g., y-z plane) and a second threshold range 812 across a second plane 813 (x-z plane). The first plane 811 and the first threshold range 801 can be orthogonal to the second plane 813 and the second threshold range 812.

At the first linear portion 420, the planar frame 802 can be attached to or integral with a guide protrusion 824 that defines the guide opening 424. The guide protrusion 824 can extend away from the planar frame 802 along an orthogonal direction (e.g., along the x-axis). The guide opening 424 can have a fixed orientation. For example, the guide opening 424 can be orthogonal to the length of the first linear portion 420. The guide opening 424 can be configured to direct movements of portions of the routing conduit 402 closest to the end effector 322 along a path that is fixed relative to the end effector 322, the second link 316, and/or the distal set of joints.

Sliding Conduit Mount

FIGS. 9A-9D are detailed views of an example sliding mount (e.g., the sliding conduit mount 412) in accordance with one or more embodiments of the present technology. FIGS. 9A-9D can illustrate the sliding conduit mount 412 from different viewing angles/perspectives. For example, FIGS. 9A-9D can correspond to successively rotating viewpoints with or without the routing conduit 412 attached to the sliding conduit mount 412.

The sliding conduit mount 412 can be configured to attach (via, e.g., fasteners, screws, nuts, bolts, rivets, nails, and/or mounts) to a structural member of the robotic unit 300, such as the second link 316. The sliding conduit mount 412 can include, at or near the top end as shown in FIGS. 9A-9D, the sliding bracket 414. The sliding bracket 414 can be attached to the sliding conduit mount 412 by the rail mechanism 416.

The rail mechanism 416 can be a set of parallel rails that extend parallel to the length of the second link 316. In some embodiments, the rail mechanism 416 can include a set of parallel rails (e.g., two rails for a dual rail mechanism), such as rails 902 and 904. The sliding bracket 414 can be configured to move or slide linearly along the rail mechanism 416. The rail mechanism 416 can be biased to bring the sliding bracket 414 back to a default position, such as the top of the rail mechanism 416 as shown in FIGS. 9A-9D (i.e., the proximate end of the rail mechanism 416). The sliding bracket 414 can allow the routing conduit 402 to move or slide linearly along a predetermined or known path/points along the second link 316 when the robotic unit 300 is in motion. For example, when various joints of the robotic unit 300 are rotating and causing the links and/or end effector 322 to change orientation and/or position, the sliding bracket 414 can traverse up and down the rail mechanism 416 in FIGS. 9A-9D to feed and retract the routing conduit 402. The sliding bracket 414 can also control an amount or location of slack in the routing conduit 402. For example, the sliding bracket 414 can increase or decrease the amount of slack of the routing conduit 402 along the second link 316. The sliding bracket 414 can also move the slack of the routing conduit 402 away from the second link 316 and/or the distal set of joints.

The sliding conduit mount 412 can include, at or near the bottom end as shown in FIGS. 9A-9D, the guide bracket 418. The guide bracket 418 can allow the routing conduit 402 to pass, slide, and/or extend to the distal end of the robotic unit 300. The guide bracket 418 can also keep and guide the routing conduit 402 along a relatively fixed path about the distal set of joints.

FIG. 10 is an example flow diagram 1000 for assembling a robotic system (e.g., the robotic system 100 of FIG. 1 or a portion thereof, such as the robotic unit 300 of FIG. 3A) in accordance with one or more embodiments of the present technology. For example, the flow diagram 1000 can be for assembling the robotic unit 300 and/or the routing mechanism 302 of FIG. 3A.

At block 1002, external components may be at least partially surrounded by the routing conduit 402 of FIG. 4. For example, the external components 403 of FIG. 4 may be placed inside the routing conduit 402, such as through a sleeve. Accordingly, the routing conduit 402 can extend along at least a portion of a length of the second link 316 of FIG. 3A, across the distal set of joints, and/or to the end effector 322 of FIG. 3A.

At block 1004, a linear path for the external components 403 may be provided along the length of the second link 316. For example, the linear path may be provided by the sliding conduit mount 412 of FIG. 4. At block 1012, providing the sliding conduit mount 412 can include coupling (e.g., attaching) the sliding conduit mount 412 to the second link 316 and/or the routing conduit 402. In some embodiments, the rail mechanism 416 of FIG. 4 may be attached parallel to second link 316 and oriented parallel to the length of the second link 316. The sliding bracket 414 of FIG. 4 may be attached to a portion of the routing conduit 402. The sliding bracket 414 may be coupled to the rail mechanism 416 and be configured to slide along the rail mechanism 416, thereby providing a linear path for the attached portion of the routing conduit 402. Accordingly, the sliding conduit mount 412 can adjust and maintain the routing conduit 402 along the linear path across/during movement of the second link 316 and/or the end effector 322. At block 1014, a biasing force may be applied to the routing conduit 402 (via, e.g., the sliding conduit mount 412 and through the attached portion of the routing conduit 402). For example, the sliding conduit mount 412 can include a biasing mechanism (e.g., a spring-loaded mechanism) that provides a constant force along a length of the second link 316 and away from the end effector 322. Accordingly, the sliding conduit mount 412 can maintain the attached portion of the routing conduit 412 and/or any slack in the routing conduit 412 away from the end effector 322.

At block 1006, a set of guide locations may be provided. The set of guide locations may be provided by attaching the guide brackets 418, 410, 602, and/or 604 to the second link 316, the distal set of joints, and/or the end effector 322. The set of guide locations may be configured to operate as a set with along with the guide opening 424 of FIG. 4 to control the pose of the routing conduit 402 at or within a threshold distance from one or more corresponding locations (e.g., attachment points) on the second link 316, the distal set of joints, and/or the end effector 322. Accordingly, the routing conduit 402 and the external components 403 therein can be placed through the brackets 418, 410, 602, and/or 604, the guide opening 424, etc. At the terminal, the routing conduit 402 and/or the external components 403 can be connected to the end effector 322.

FIG. 11 is an example flow diagram 1100 for operating a robotic system (e.g., the robotic system 100 of FIG. 1 or a portion thereof, such as the robotic unit 300 of FIGS. 3A and 3B and/or the routing mechanism 302 of FIGS. 3A and 3B, in accordance with one or more embodiments of the present technology. The flow diagram 1100 can correspond to the routing mechanism 302 adjusting the routing conduit 402 of FIG. 4 and the external components 403 of FIG. 4 therein across/during movement of the second link 316 of FIG. 3A and/or the end effector 322 of FIG. 3A.

At block 1102, an end effector (e.g., the end effector 322) and/or a link (e.g., the second link 316 of FIG. 3A may be moved), such as to implement a task. The movement of the link and/or the end effector can change the poses of the link and the end effector relative to each other. The changed poses can change a travel distance for the external components, such as in extending around the distal set of joints.

At block 1104, a conduit may be guided along a linear path in reaction to the change in travel distance. For example, the attached portion of the routing conduit 402 of FIG. 4 can be guided along the linear path associated with the sliding conduit mount 412 of FIG. 4. When the travel distance increases, the attached portion can move toward the end effector 322 along the kinetic chain. When the travel distance decreases, such as illustrated at block 1112, the attached portion of the conduit may be returned toward a default position/pose based on the applied biasing force.

At block 1106, the conduit may be guided along a set of pass-through locations. The routing conduit 402 can be moved through the guide brackets 418, 410, 602, and/or 604, the guide opening 424, etc. The routing conduit 402 may be maintained along the predetermined path around the distal set of joints (e.g., within threshold distances from corresponding locations) as described above.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A routing device configured to control a pose of a set of connections that extend toward and are coupleable to an end effector, the routing device comprising:
   a routing conduit configured to at least partially surround the set of connections and extend generally parallel to the set of connections;
   a sliding conduit mount configured to provide a linear path for guiding the routing conduit to traverse in reaction to a movement of the end effector;
   a set of guide brackets at least partially surrounding the routing conduit and positionable between the sliding conduit mount and the end effector along a kinetic chain associated with the end effector, wherein the set of guide brackets includes a pivotable bracket configured to pivot around a twist axis for controlling a shape of the routing conduit and for providing a pass-through location for the routing conduit during the movement of the end effector relative to a link; and
   a conduit stability mount coupled to the set of guide brackets and configured to provide a basis for controlling a pose of the routing conduit during movement of the end effector relative to the link, the conduit stability mount having a first protrusion coupled to the pivotable bracket and a second protrusion extending away from the first protrusion at an angle less than 180 degrees.

2. The routing device of claim 1, wherein:
   the set of guide brackets is configured to maintain the routing conduit for guiding the routing conduit at or passing through one or more predetermined locations about a set of joints connecting the link to the end effector.

3. The routing device of claim 2, wherein the routing conduit, the sliding conduit mount, the set of guide brackets, and the conduit stability mount are configured to provide a predetermined path for the set of connections for moving with a robotic arm in a teach-less robotic system and/or for moving with unplanned motions of the robotic arm, and wherein the robotic arm corresponds to the kinetic chain.

4. The routing device of claim 2, wherein the set of guide brackets includes a first bracket configured to be fixed relative to the link, and a second bracket configured to be attached to a structure in the set of joints, and a third bracket positionable opposite the set of joints along the kinetic chain.

5. The routing device of claim 1, wherein the sliding conduit mount is configured to provide a force on the routing conduit along the linear path and away from the end effector for pulling the routing conduit or any slack therein away from the end effector.

6. The routing device of claim 5, wherein the sliding conduit mount is positionable opposite the end effector across the set of guide brackets.

7. The routing device of claim 5, wherein the sliding conduit mount is configured to maintain any slack in the routing conduit across or about a twist joint configured to pivot a link around a twist axis that extends parallel to the length of the link.

8. The routing device of claim 1, wherein the routing conduit includes a u-shaped portion configured to be fixed in a position distal to the pivotable bracket from the set of guide brackets.

* * * * *